(12) United States Patent
Nielsen et al.

(10) Patent No.: US 6,801,424 B1
(45) Date of Patent: Oct. 5, 2004

(54) ELECTROLYTIC CAPACITOR FOR USE IN AN IMPLANTABLE MEDICAL DEVICE

(75) Inventors: Christian S. Nielsen, River Falls, WI (US); Mark Edward Viste, Brooklyn Center, MN (US); Anthony W. Rorvick, Champlin, MN (US); David P. Haas, Brooklyn Park, MN (US); Joachim Hossick-Schott, Minneapolis, MN (US); John D. Norton, New Brighton, MN (US); Timothy T. Bomstad, Inver Grove Heights, MN (US); Kurt J. Casby, Grant, MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 10/452,430

(22) Filed: May 30, 2003

(51) Int. Cl.[7] .............................. H01G 2/10; A61N 1/18
(52) U.S. Cl. .............................. 361/517; 361/535; 607/5
(58) Field of Search .......................... 361/503, 517–521, 361/537–538; 607/5

(56) References Cited

U.S. PATENT DOCUMENTS

| | | | |
|---|---|---|---|
| 5,369,547 A | | 11/1994 | Evans |
| 5,522,851 A | * | 6/1996 | Fayram .......................... 607/5 |
| 5,737,181 A | | 4/1998 | Evans |
| 5,982,609 A | | 11/1999 | Evans |
| 6,334,879 B1 | | 1/2002 | Muffoletto et al. |
| 6,522,525 B1 | * | 2/2003 | O'Phelan et al. ........... 361/509 |
| 6,648,928 B2 | * | 11/2003 | Nielsen et al. ............. 29/25.03 |
| 6,678,559 B1 | * | 1/2004 | Breyen et al. .................. 607/5 |

\* cited by examiner

Primary Examiner—Dean A. Reichard
Assistant Examiner—Eric Thomas
(74) Attorney, Agent, or Firm—Ingrassia Fisher & Lorenz PC

(57) ABSTRACT

A capacitor structure comprises a shallow drawn case having a first major side and a peripheral wall extending therefrom, the first major side having a first interior surface and the wall having a peripheral interior surface. A lid is sealingly coupled to the case along adjacent edges of the lid and the wall, the lid and said case forming an encasement of the capacitor structure, the lid comprising a second interior surface. A cathode material is disposed proximate the first and second interior surfaces, and an anode is positioned intermediate the cathode material and has a peripheral portion positioned proximate the adjacent edges. A protective layer on the peripheral portion protects the anode during the sealing process. A first insulative separator is positioned between the anode and the cathode material.

37 Claims, 6 Drawing Sheets

ELECTROLYTIC CAPACITOR FOR USE IN AN IMPLANTABLE MEDICAL DEVICE

FIELD OF THE INVENTION

The present invention generally relates to capacitors, and more particularly to a thin electrolytic capacitor suitable for use in an implantable medical device such as an implantable cardiac defibrillator (ICD).

BACKGROUND OF THE INVENTION

ICDs are devices that are typically implanted in a patient's chest to treat very fast, and potentially lethal, cardiac arthythmias. These devices continuously monitor the heart's electrical signals and sense if, for example, the heart is beating dangerously fast. If this condition is detected, the ICD can deliver one or more electric shocks, within about five to ten seconds, to return the heart to a normal heart rhythm. These defibrillation electric shocks may range from a few micro-joules to very powerful shocks of approximately twenty-five joules to forty joules.

Early generations of ICDs utilized high-voltage, cylindrical capacitors to generate and deliver defibrillation shocks. For example, standard wet slug tantalum capacitors generally have a cylindrically shaped conductive casing serving as the terminal for the cathode and a tantalum anode connected to a terminal lead electrically insulated from the casing. The opposite end of the casing is also typically provided with an insulator structure.

One such capacitor is shown and described in U.S. Pat. No. 5,369,547 issued on Nov. 29, 1994 and entitled "Capacitor". This patent disclosed an electrolytic capacitor that includes a metal container that functions as a cathode. A porous coating, including an oxide of a metal selected from the group consisting of ruthenium, iridium, nickel, rhodium, platinum, palladium, and osmium, is disposed proximate an inside surface of the container and is in electrical communication therewith. A central anode selected from the group consisting of tantalum, aluminum, niobium, zirconium, and titanium is spaced from the porous coating, and an electrolyte within the container contacts the porous coating and the anode.

U.S. Pat. No. 5,737,181 issued on Apr. 7, 1998 and entitled "Capacitor" describes a capacitor that includes a cathode material of the type described in the above cited patent disposed on each of two opposed conducting plates. A metal anode (also of the type described in the above cited patent) is disposed between the cathode material coating and the conducting plates.

U.S. Pat. No. 5,982,609 issued Nov. 9, 1999 and entitled "Capacitor" describes a capacitor that includes a cathode having a porous coating including an amorphous metal oxide of at least one metal selected from the group consisting of ruthenium, iridium, nickel, rhodium, rhenium, cobalt, tungsten, manganese, tantalum, molybdenum, lead, titanium, platinum, palladium, and osmium. An anode includes a metal selected from the group consisting of tantalum, aluminum, niobium, zirconium, and titanium.

While the performance of these capacitors was acceptable for defibrillator applications, efforts to optimize the mechanical characteristics of the device have been limited by the constraints imposed by the cylindrical design. In an effort to overcome this, flat electrolytic capacitors were developed. U.S. Pat. No. , 5,926, 362 issued on Jul. 20, 1999 and entitled "Hermetically Sealed Capacitor" describes a deep-drawn sealed capacitor having a generally flat, planar geometry. The capacitor includes at least one electrode provided by a metallic substrate in contact with a capacitive material. The coated substrate may be deposited on a casing side-wall or connected to a side-wall. The capacitor has a flat planar shape and utilizes a deep-drawn casing comprised of spaced apart side-walls joined at their periphery by a surrounding intermediate wall. Cathode material is typically deposited on an interior side-wall of the conductive encasement which serves as one of the capacitor terminals; e.g. the cathode. The other capacitor terminal (the anode) is isolated from the encasement by an insulator/feedthrough structure comprised of, for example, a glass-to-metal seal. It is also known to deposit cathode material on a separate substrate that is placed in electrical communication with the case. In another embodiment, the cathode substrate is insulated from the case using insulators and a separate cathode feedthrough.

A valve metal anode made from metal powder is pressed and sintered to form a porous structure, and a wire (e.g. tantalum) is imbedded into the anode during pressing to provide a terminal for joining to the feedthrough. A separator (e.g. polyolefin, a fluoropolymer, a laminated film, nonwoven glass, glass fiber, porous ceramic, etc.) is provided between the anode and the cathode to prevent short circuits between the electrodes. Separator sheets are sealed either to a polymer ring that extends around the perimeter of the anode or to themselves.

A separate weld ring and polymer insulator may be utilized for thermal beam protection as well as anode immobilization. Prior to encasement welding, a separator encased anode is joined to the feedthrough wire by, for example, laser welding. This joint is internal to the capacitor. The outer metal encasement structure is comprised essentially of two symmetrical half shells that overlap and are welded at their perimeter seam to form a hermetic seal. After welding, the capacitor is filled with electrolyte through a port in the encasement.

The above described techniques, present concerns relating to both device size and manufacturing complexity. The use of overlapping half-shields results in a doubling of the encasement thickness around the perimeter of the capacitor thus reducing the available interior space for the capacitor's anode. This results in larger capacitors. Space for the anode material is further reduced by the presence of the weld ring and space insulator. In addition, manufacturing processes become more complex and therefore more costly, especially in the case of a deep-drawn encasement.

A further disadvantage of the known design involves the complexity of the anode terminal-to-feedthrough terminal weld joint. As was described, a tantalum anode lead is imbedded into the anode and is joined via laser welding to a terminal lead of the feedthrough. This is typically accomplished by forming a "J" or "U" shape with one or more of the leads, pressing the terminal end of these leads together, and laser welding the interface. In order to accomplish this, one must either perform this step prior to welding the feedthrough ferrule into the encasement or sufficient space must be provided in the capacitor anode structure to facilitate clamping and welding while the anode is in the case. This results in additional manufacturing complexity while the latter negatively impacts device size.

As stated previously, a separator material is provided on the anode and may be sealed to itself to form an envelope. The anode is typically on the order of 0.1 inch thick. As a result, the sealing operation is complex, and significant separator material typically overhangs the anode. This overhang must be accommodated in the design and typically either reduces the size of the anode or increases the size of the capacitor. Furthermore, due to the proximity of thermally sensitive separator material to the encasement, the separator is in direct contact with the cathode/encasement structure. Weld parameters must therefore be carefully selected to prevent thermal damage of the separator material. When cathode material is deposited on a separate substrate, as described above, substrate thickness further reduces the space available for anode material or increases the size of the capacitor.

Thus, while the development of flat electrolytic capacitors significantly reduces size and thickness, defibrillation capacitors are still the largest components in current ICDs making further downsizing a primary objective.

BRIEF SUMMARY OF THE INVENTION

According to an aspect of the invention, there is provided a capacitor structure, comprising a shallow drawn case having a first major side and a peripheral wall extending therefrom, the first major side having a first interior surface and the wall having a peripheral interior surface. A lid is sealingly coupled to the case along adjacent edges of the lid and the wall, the lid and the case forming an encasement of the capacitor structure, the lid comprising a second interior surface. A cathode material is disposed proximate the first and second interior surfaces, and an anode is positioned intermediate the cathode material and has a peripheral portion positioned proximate the adjacent edges. A protective layer on the peripheral portion protects the anode during the encasement sealing process. A first insulative separator is positioned between the anode and the cathode material.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the scope, applicability, or configuration of the invention in any way. Rather, the following description provides a convenient illustration for implementing exemplary embodiments of the invention. Various changes to the described embodiments may be made in the function and arrangement of the elements described herein without departing from the scope of the invention.

Figure 1:
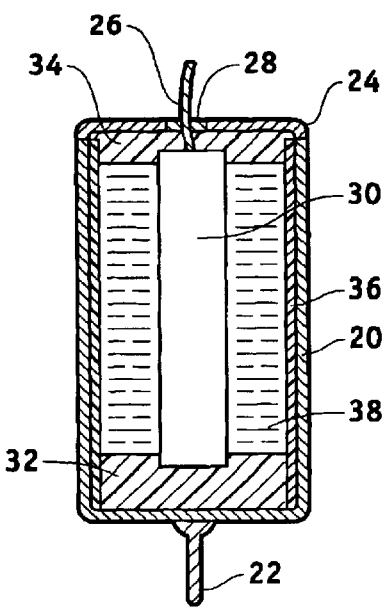
FIG. 1 is a cross-sectional view of an electrolytic capacitor in accordance with the teachings of the prior art.

FIG. 1 is a cross-sectional view of an electrolytic capacitor in accordance with the teachings of the prior art. It comprises a cylindrical metal container 20 made of, for example tantalum. Typically, container 20 comprises the cathode of the electrolytic capacitor and includes a lead 22 that is welded to the container. An end scat of cap 24 includes a second lead 26 that is electrically insulated from the remainder of cap 24 by means of a feed-through assembly 28. Cap 24 is bonded to container 20 by, for example, welding. Feed-through 28 of lead 26 may include a glass-to-metal seal through which lead 26 passes. An anode 30 (e.g., porous sintered tantalum) is electrically connected to lead 26 and is disposed within container 20. Direct contact between container 20 and anode 30 is prevented by means of electrically insulating spacers 32 and 34 within container 20 that receive opposite ends of anode 30. A porous coating 36 is formed directly on the inner surface of container 20. Porous coating 36 may include an oxide of ruthenium, iridium, nickel, rhodium, platinum, palladium, or osmium. As stated previously, anode 30 may be made of a sintered porous tantalum. However, anode 30 may be aluminum, niobium, zirconium, or titanium. Finally, an electrolyte 38 is disposed between and in contact with both anode 30 and cathode coating 36 thus providing a current path between anode 30 and coating 36. As stated previously, while capacitors such as the one shown in FIG. 1 were generally acceptable for defibrillator applications, optimization of the device is limited by the constraints imposed by the cylindrical design.

Figure 3:
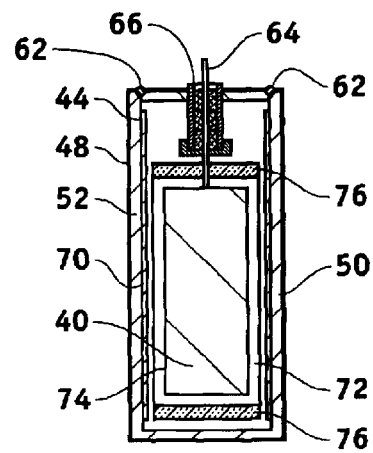
FIGS. 2, 3, and 4 are front, side, and top cross-sectional views of a flat electrolytic capacitor in accordance with the teachings of the prior art.
Figure 2:
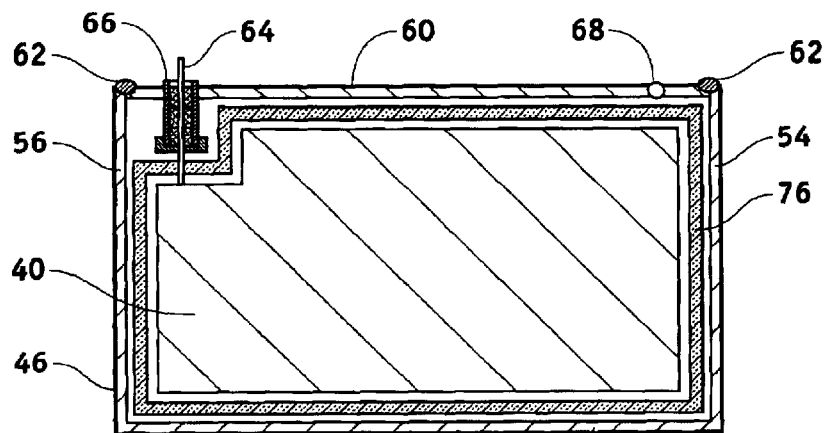
Figure 4:
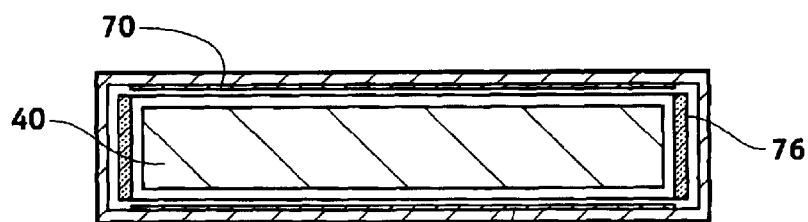

FIGS. 2, 3, and 4 are front, side, and top cross-sectional views respectively of a flat electrolytic capacitor, also in accordance with the teachings of the prior art, designed to overcome some of the disadvantages associated with the electrolytic capacitor shown in FIG. 1. The capacitor of FIGS. 2, 3, and 4 comprises an anode 40 and a cathode 44 housed inside a hermetically sealed casing 46. The capacitor electrodes are activated and operatively associated with each other by means of an electrolyte contained inside casing 46. Casing 46 includes a deep drawn can 48 having a generally rectangular shape and comprised of spaced apart side-walls 50 and 52 extending to and meeting with opposed end walls 54 and 56 extending from a bottom wall 58. A lid 60 is secured to side-walls 50 and 52 and to end walls 54 and 56 by a weld 62 to complete an enclosed casing 46. Casing 46 is made of a conductive metal and serves as one terminal or contact for making electrical connections between the capacitor and its load.

The other electrical terminal or contact is provided by a conductor or lead 64 extending from within the capacitor through casing 46 and, in particular, through lid 60. Lead 64 is insulated electrically from lid 60 by an insulator and seal structure 66. An electrolyte fill opening 68 is provided to permit the introduction of an electrolyte into the capacitor, after which opening 68 is closed. Cathode electrode 44 is spaced from the anode electrode 40 and comprises an electrode active material 70 provided on a conductive substrate. Conductive substrate 70 may be selected from the group consisting of tantalum, nickel, molybdenum, niobium, cobalt, stainless steel, tungsten, platinum, palladium, gold, silver, cooper, chromium, vanadium, aluminum, zirconium, hafnium, zinc, iron, and mixtures and alloys thereof. Anode 40 may be selected from the group consisting of tantalum, aluminum, titanium, niobium, zirconium, hafnium, tungsten, molybdenum, vanadium, silicon, germanium, and mixtures thereof. A separator structure includes spaced apart sheets 72 and 74 of insulative material (e.g. a microporous polyolefinic film). Sheets 72 and 74 are connected to a polymeric ring 76 and are disposed intermediate anode 40 and coated side-walls 50 and 52 which serve as a cathode electrode.

Figure 5:
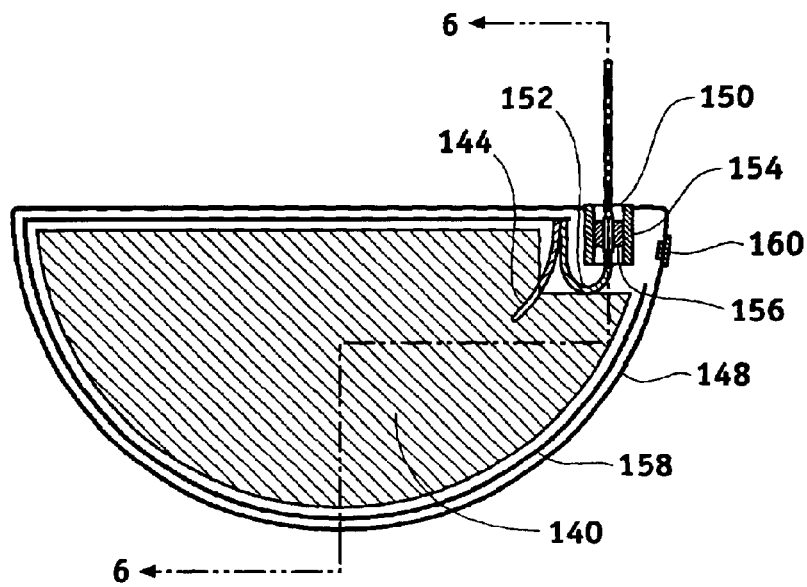
FIGS. 5, 6, and 7 are front cross-sectional, side cross-sectional, and scaled cross-sectional views of an electrolytic capacitor in accordance with a first embodiment of the present invention and suitable for use in an implantable medical device.
Figure 6:
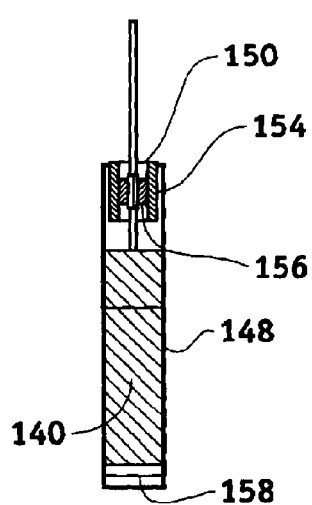
Figure 7:
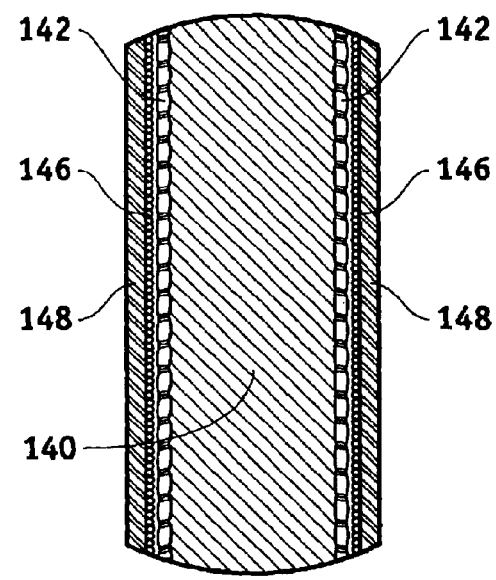

As already mentioned, the above described capacitors present certain concerns with respect to device size and manufacturing complexity. In contrast, FIGS. 5, 6, and 7 are front cross-sectional, side cross-sectional, and scaled cross-sectional views of an electrolytic capacitor suitable for use in an implantable medical device in accordance with a first embodiment of the present invention. As can be seen, one or more layers of an insulative polymer separator material 142 (e.g. micro-porous IFRE or polypropylene) are heat sealed around a thin, D-shaped anode 140 (e.g. tantalum) having an anode lead wire 144 (e.g. tantalum) embedded therein. Capacitor grade tantalum powder such as the "NH" family of powders may be employed for this purpose. These tantalum powders have a charge per gram rating of between approximately 17,000 to 23,000 microfarad-volts/gram and have been found to be well suited for implantable cardiac device capacitor applications. Tantalum powders of this type are commercially available from HC Starck, Inc. located in Newton, Mass.

Before pressing, the tantalum powder is typically, but not necessarily, mixed with approximately 0 to 5 percent of a binder such as ammonium carbonate. This and other binders are used to facilitate metal particle adhesion and die lubrication during anode pressing. The powder and binder mixture are dispended into a die cavity and are pressed to a density of approximately 4 grams per cubic centimeter to approximately 8 grams per cubic centimeter. After pressing, it is sometimes beneficial to modify anode porosity to improve conductivity within the internal portions of the anode. Porosity modification has been shown to significantly reduce resistance. Macroscopic channels are incorporated into the body of the anodes to accomplish this. Binder is then removed from the anodes either by washing in warm deionized water or by heating at a temperature sufficient to decompose the binder. Complete binder removal is desirable since residuals may result in high leakage current. Washed anodes are then vacuum sintered at between approximately 1,350 degrees centigrade and approximately 1,600 degrees centigrade to permanently bond the metal anode particles.

An oxide is formed on the surface of the sintered anode by immersing the anode in an electrolyte and applying a current. The electrolyte includes constituents such as water and phosphoric acid and perhaps other organic solvents. The application of current drives the formation of an oxide film that is proportional in thickness to the targeted forming voltage. A pulsed formation process may be used wherein current is cyclically applied and removed to allow diffusion of heated electrolyte from the internal pores of the anode plugs. (See U.S. patent application Ser. No. 10/261,066 filed Sep. 30, 2002 entitled "Method and Apparatus for Maintaining Energy Storage in an Electrical Storage Device" the teachings of which are hereby incorporated by reference.) Intermediate washing and annealing steps may be performed to facilitate the formation of a stable, defect free, oxide.

Layers of cathode material 146 are deposited on the inside walls of a thin, shallow drawn, D-shaped casing 148 (e.g. titanium) having first and second major sides and a peripheral wall, each of which have an interior surface. The capacitive materials may be selected from those described above or selected from the group including graphitic or glassy carbon on titanium carbide, carbon and silver vanadium oxide on titanium carbide, carbon and crystalline manganese dioxide on titanium carbide, platinum on titanium, ruthenium on titanium, barium titanate on titanium, carbon and crystalline ruthenium oxide on titanium carbide, carbon and crystalline iridium oxide on titanium carbide, silver vanadium oxide on titanium, and the like.

Anode 140 and cathode material 146 are insulated from each other by means of a micro-porous polymer separator material such as a PTFE separator of the type produced by W. L. Gore, Inc. located in Elkton, Md. or polypropylene of the type produced by Celgard, Inc. located in Charlotte, N.C. Separators 146 prevent physical contact and shorting and also provide for iomionic conduction. The material may be loosely placed between the electrodes or can be sealed around the anode and/or cathode. Common sealing methods include heat sealing, ultra sonic bonding, pressure bonding, etc.

Figure 8:
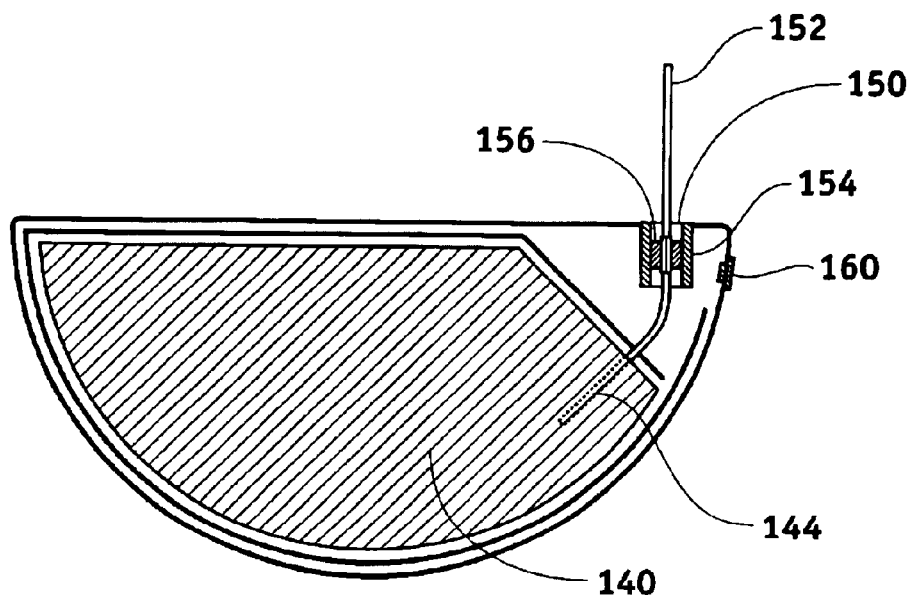
FIGS. 8, and 9 are side cross-sectional and scaled cross-sectional views of an electrolytic capacitor in accordance with a further embodiment of the present invention.

The electrodes are housed in a shallow drawn, typically D-shaped case (e.g. titanium) that may have a material thickness approximately 0.005 to 0.016 inches thick. A feed-through 150 is comprised of a ferrule 154 (e.g. titanium), a terminal lead wire 152 (e.g. tantalum), and an insulator 156 (e.g. a polycrystalline ceramic polymer, non-conducting oxides, conventional glass, etc.) is bonded to ferrule 154 and lead wire 152. Sealed anode 140 is inserted into a cathode coated case and a spacer ring is inserted around the periphery of the anode to secure the position of the anode within the case. A J-shaped feed-though lead wire 152 is electrically coupled to anode lead wire 144 as, for example, by resistance or laser welding. In accordance with an aspect of the present invention, lead wire 152 may be joined to anode lead wire 144 without the necessity for a J-shaped bend as will be fully described hereinbelow and as represented in FIG. 8. The lid is positioned and secured in the case by welding.

After assembly and welding, an electrolyte is introduced into the casing through a fill-port 160. The electrolyte is a conductive liquid having a high breakdown voltage that is typically comprised of water, organic solvents, and weak acids or of water, organic solvents and sulfuric acid. Filling is accomplished by placing the capacitor in a vacuum chamber such that fill-port 160 extends into a reservoir of electrolyte. When the chamber is evacuated, pressure is reduced inside the capacitor. When the vacuum is released, pressure inside the capacitor re-equilibrates, and electrolyte is drawn through fill-port 160 into the capacitor.

Filled capacitors are aged to form an oxide on the anode leads and other areas of the anode. Aging, as with formation, is accomplished by applying a current to the capacitor. This current drives the formation of an oxide film that is proportional in thickness to the targeted aging voltage. Capacitors are typically aged approximately at or above their working voltage, and are held at this voltage until leakage current reaches a stable, low value. Upon completion of aging, capacitors are re-filled to replenish lost electrolyte, and the fill-port 160 is sealed as, for example, by laser welding a closing button or cap over the encasement opening.

Figure 9:
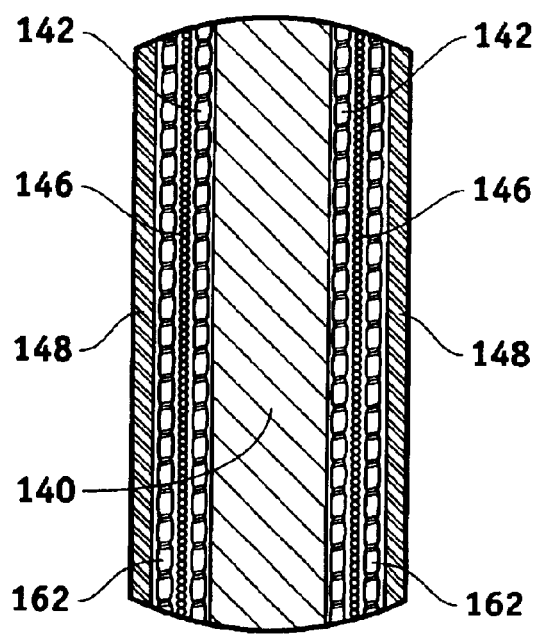

FIGS. 8 and 9 are a side cross-sectional and scaled cross-sectional views of an electrolytic capacitor suitable for use in an implantable medical device in accordance with a further embodiment of the present invention. In this case, cathode material is deposited on two substrates 146 (e.g. titanium) which are separate from encasement 148. Before cathode deposition, the substrates may be chemically or mechanically modified to increase surface area. Methods suitable for this purpose include, but are not limited to, etching, abrasion, and medium blasting.

Figure 11:
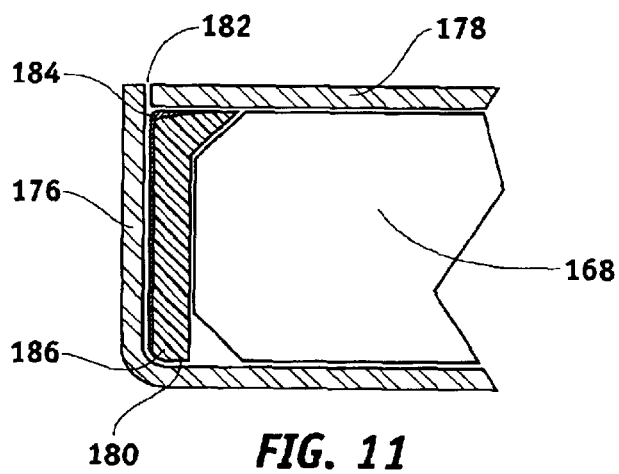
FIG. 11 is a cross-sectional view of a novel capacitor/anode encasement assembly.

As previously described, an insulative separator is heat sealed around a thin, D-shaped, anode (e.g. tantalum) having an imbedded lead wire 144 (e.g. tantalum) imbedded therein as is shown in FIGS. 8, 9, and 11. Anode 140 is sandwiched between two cathodes 146. Additional layers of insulative separator material 162 are utilized between encasement 148 and cathodes 146 so as to prevent unwanted electrical contact between the cathodes and the encasement sidewalls. Alternatively, the cathodes may be sealed in separators thus eliminating the need for a separator on the anode. Of course, encasement 148 may be utilized as a cathode terminal by simply electrically coupling cathodes 146 to the encasement Insulative material 162 may comprise polymer sheets, formed polymer caseliners, polymer coated cases, sputtered insulating oxides, etc. As already described in connection with FIGS. 5, 6, and 7, the electrode stack shown in FIG. 9 is inserted into the encasement, and the embedded anode lead wire is resistance or laser welded to a feedthrough lead wire. A cover is assembled over the electrode stack, and the assembly is completed by means of, for example, laser welding.

Figure 10:
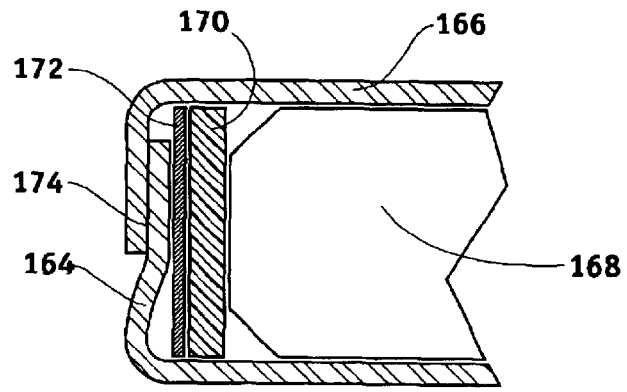
FIG. 10 is a cross-sectional view of a capacitor/anode encasement structure in accordance with the teachings of the prior art.

As stated previously, the outer metal encasement structure of a known planar capacitor generally comprises two symmetrical half shells that overlap and are then welded along their perimeter seam to form a hermetic seal. Such a device is shown in FIG. 10. That is, the encasement comprises a case 164 and an overlapping cover 166. A separator sealed anode 168 is placed within case 164, and a polymer spacer ring 170 is positioned around the periphery of anode assembly 168. Likewise, a metal weld ring 172 is positioned around the periphery of spacer ring 170 proximate the overlapping portion 174 of case 164 and cover 166. The overlapping portions of case 164 and cover 166 are then welded along the perimeter seam to form a hermetic seal.

This technique presents certain concerns relating to both device size and manufacturing complexity. The use of overlapping half-shields results in a doubling of the encasement thickness around the perimeter of the capacitor thus reducing the available interior space for the anode. Thus, for a given size anode, the resulting capacitor is larger. Furthermore, space for anode material is reduced due to the presence of weld ring 172 and insulative polymer spacer ring 170. This device is more complex to manufacture and therefore more costly.

FIG. 11 is a cross-sectional view illustrating one of the novel aspects of the present invention. In this embodiment, the encasement is comprised of a shallow drawn case 176 and a cover or lid 178. This shallow drawn encasement design uses a top down welding approach. Material thickness is not doubled in the area of the weld seam as was the situation in connection with the device shown in FIG. 10 thus resulting in additional space for anode material.

Cover 178 is sized to fit into the open side of shallow drawn metal case 176. This results in a gap (e.g. from 0 to approximately 0.002 inches) in the encasement between case 176 and cover 178 that could lead to the penetration of the weld laser beam thus potentially damaging the capacitor's internal components. To prevent this, a metalized polymeric weld ring is placed or positioned around the periphery of anode 168. Weld ring 180 is somewhat thicker than the case to cover gap 182 to maximize protection. Metalized weld ring 180 may comprise a polymer spacer 186 having a metalized surface 184 as shown. Metalized weld ring 180 provides for both laser beam shielding and anode immobilization. The metalized polymer spacer 180 need only be thick enough to provide a barrier to penetration of the laser beam and is sacrificial in nature. This non-active component substantially reduces damage to the active structures on the capacitor.

Metalized polymer spacer 180 is placed around the perimeter of anode 168 during assembly and may be produced my means of injection molding, thermal forming, tube extrusion, die cutting of extruded or cast films, etc. Spacer 180 may be provided through the use of a pre-metalized polymer film. Alternatively, the metal may be deposited during a separate process after insulator production. Suitable metallization materials include aluminum, titanium, etc. and mixtures and alloys.

Figure 12:
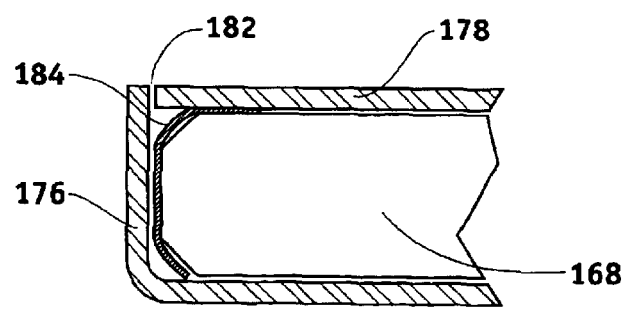
FIG. 12 is a cross-sectional view of an alternative capacitor/anode encasement assembly.

FIG. 12 is a cross-sectional view illustrating an alternative to the embodiment shown in FIG. 11. Again, the encasement comprises a case 176 and a cover or lid 178 resulting in gap 182. The anode assembly 168 is positioned within the encasement as was the situation in FIG. 11. To protect the capacitor's internal components from damage due to the weld laser beam, a metalized tape 184 is positioned around the perimeter of anode 168.

The embodiments shown in FIGS. 11 and 12 not only have space saving aspects in the encasement design, but the components are simple and inexpensive to produce. The top down assembly facilitates fabrication and welding processes. The thinness of the weld ring/spacer 180 or metalized tape 184 reduces the need for additional space around the perimeter of the capacitor thus improving energy density. The design lends itself to mass production methods and reduces costs, component count, and manufacturing complexity.

As stated previously, a major disadvantage of prior art electrolytic capacitors resides in the complexity of producing a proper weld joint between the anode terminal and the feedthrough terminal. That is, the anode lead wire (e.g. tantalum) is imnbedded into the anode and is joined, by means of, for example, laser welding, to the feedthrough lead wire. This is typically accomplished by forming a "J" shape with each of the lead wires, pressing them together, and laser welding the interface. This is either performed prior to welding the feedthrough ferrule into the encasement, or alternatively, sufficient space must be provided to facilitate clamping and welding when the anode assembly is in the encasement. The former approach results in significant manufacturing complexity while the latter negatively impacts the size of the capacitor.

Figure 13:
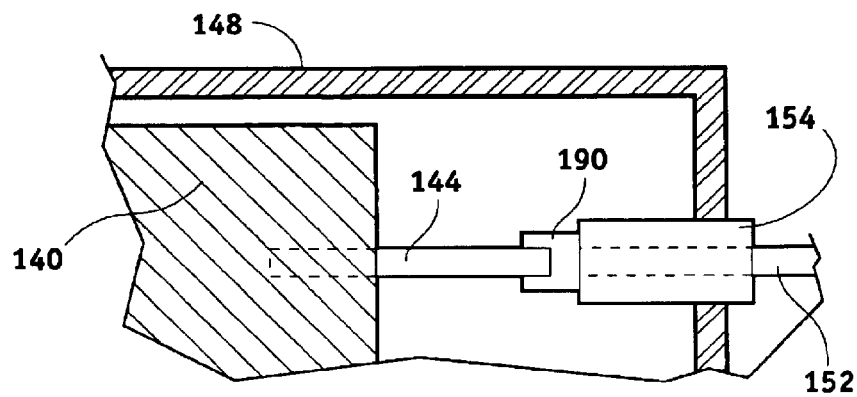
FIG. 13 illustrates a first novel technique for electrically coupling an anode lead wire through a ferrule in an electrolytic capacitor.

FIG. 13 illustrates a first technique for coupling an anode lead wire to a feedthrough lead wire which substantially avoids the above noted problems. Referring to FIG. 13 a weld block (e.g. tantalum) 190 is positioned at the internal end of feedthrough 154 such that feedthrough lead wire 152 is in electrical engagement therewith. In this case, feedthrough 154 is made of an insulative material (e.g. a glass or polymer) in order to electrically isolate anode lead wire 144 from encasement 148. When anode 140 having anode lead wire 144 imbedded therein is positioned within encasement 148, anode lead wire 144 rests, in part, on weld block 190. Electrical coupling between anode lead wire 144 and weld block 190 may be accomplished by techniques such as laser welding, parallel gap welding, etc. The need for bends in the lead wires has been eliminated thus reducing fixturing and manufacturing complexity. In fact, weld block 190 may contain locating or holding features (e.g. grooves)

that entirely eliminate the requirement for fixturing. Weld block 190 may be provided with appropriate insulation to prevent shorting to encasement 148. The size of the capacitor is reduced because it is no longer necessary to provide internal bends and weld joints in the lead wires. The reliability of the resulting structure is improved because the use of a polymeric feedthrough permits the utilization of materials that are more stable, and the elimination of internal weld joints reduces manufacturing costs and complexity.

Figure 14:
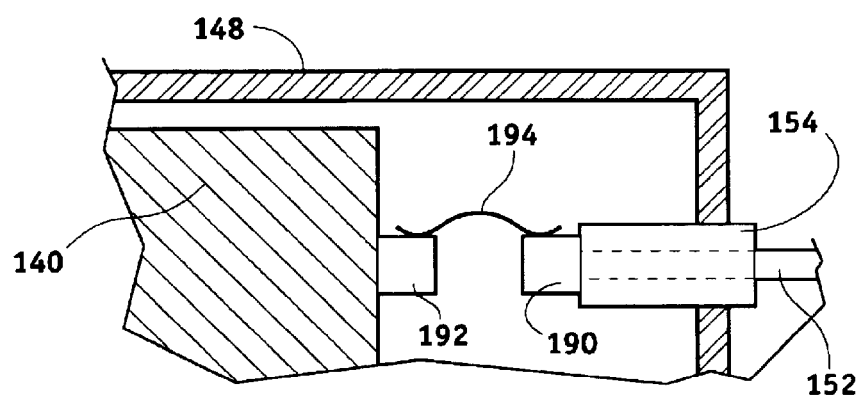
FIGS. 14–18 illustrate alternate techniques for electrically coupling an anode lead wire through a ferrule in an electrolytic capacitor.

FIG. 14 illustrates another arrangement for electrically coupling the anode to an external lead wire. As was the case previously, a feedthrough ferrule 154 is positioned within encasement 148 and is configured such that feedthrough lead wire 152 is accessible from the exterior of capacitor encasement 148. A weld block 190 is positioned at the internal end of feedthrough ferrule 154 in electrical engagement with lead wire 152. In this case however, anode 140 is likewise provided with weld block 192, and electrical coupling between weld block 192 and weld block 190 is accomplished by means of, for example, a conductive ribbon 194 electrically coupled, as for example by welding, to both anode weld block 192 and feedthrough weld block 190.

Figure 15:
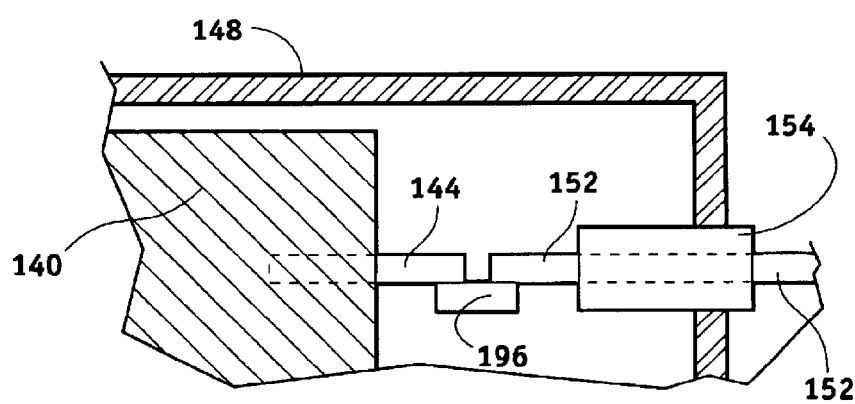

FIG. 15 illustrates yet another arrangement for electrically coupling anode lead wire 144 to feedthrough lead wire 152. An intermediate weld block (e.g. tantalum) 196 is provided within capacitor encasement 148 and is configured such that an internal end of a lead wire 152 and an end of anode lead wire 144 contact weld block 196 when anode 140 is positioned within encasement 148. Anode lead wire 144 and feedthrough lead wire 152 are then electrically coupled to weld block 196 using any known technique such as laser welding.

Figure 16:
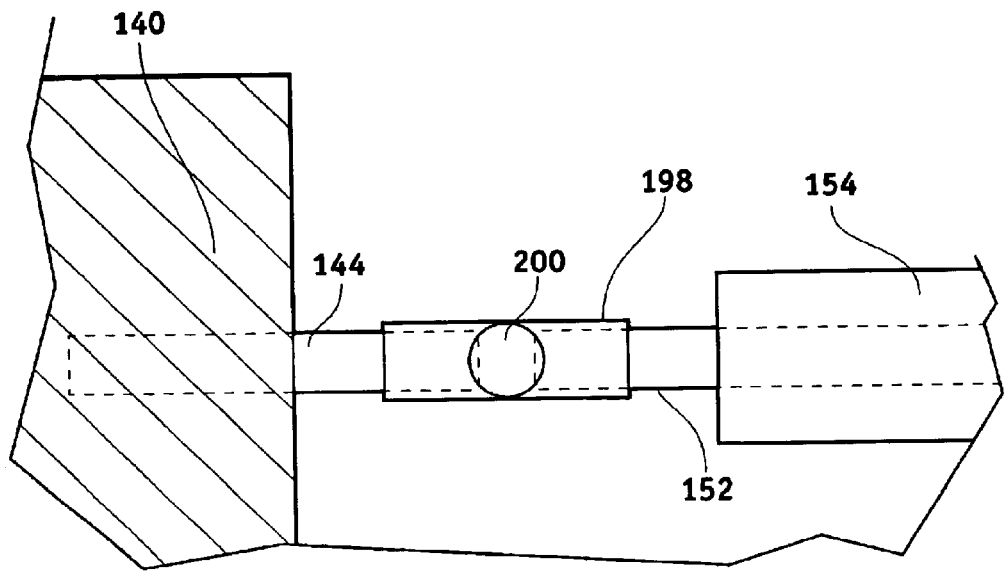
Figure 17:
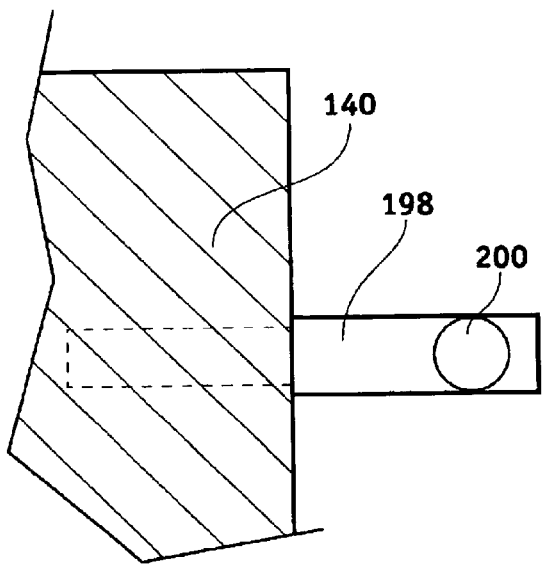
Figure 18:
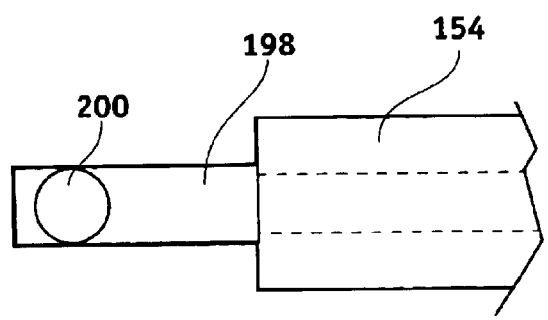

Yet another arrangement for coupling anode lead wire 144 to feedthrough lead wire 152 utilizes a small sleeve or piece of tubing 198 made of an electrically conductive material (e.g. tantalum). Referring to FIG. 16, anode lead wire 144 and feedthrough lead wire 152 are received within sleeve 198 and may be electrically coupled thereto by means of, for example, welding or crimping. An opening 200 may be provided in sleeve 198 so as to permit additional welding along the length of the leads. Sleeve 198 provides the necessary fixturing for lead wires 144 and 152, and due to it's small size, the use of sleeve 198 is conducive to device downsizing. Sleeve 198 may be imbedded in anode 140 eliminating the need for anode lead wire 144 as is shown in FIG. 17. Alternatively, sleeve 198 may be integrally coupled or formed with feedthrough ferrule 154 as is shown in FIG. 18.

Thus, there has been provided an electrolytic capacitor that is not only easier and less costly to manufacture, but one which may be made smaller for a given capacitance. The inventive capacitor is therefore suitable for use in implantable medical devices such as defibrillators, even as such devices become smaller and smaller.

What is claimed is:

1. A capacitor structure, comprising:
   a shallow drawn case having a first major side and a peripheral wall extending therefrom, said first major side having a first interior surface and said wall having a peripheral interior surface;
   a lid sealingly coupled to said case along adjacent edges of said lid and said wall, said lid and said case forming an encasement of said capacitor structure, said lid comprising a second interior surface;
   a cathode material disposed proximate said first and second interior surfaces;
   an anode positioned intermediate the cathode material and having peripheral portion positioned proximate said adjacent edges;
   a protective layer on said peripheral portion to protect said anode when said lid is sealingly coupled to said case; and
   a first insulative separator between said anode and said cathode material.

2. A capacitor structure according to claim 1 further comprising an electrolyte within said encasement and in contact with said cathode material and said anode.

3. A capacitor structure according to claim 1 wherein said protective layer comprises a metalized ring.

4. A capacitor structure according to claim 3 wherein said metalized ring comprises a polymer spacer having a metalized surface.

5. A capacitor structure according to claim 1 wherein said protective layer comprises a metallized tape.

6. A capacitor structure according to claim 1 further comprising a second insulative separator positioned between said cathode material and said first and second interior surfaces.

7. A capacitor structure according to claim 6 wherein said cathode material is electrically coupled to said encasement, said encasement forming a cathode terminal.

8. A capacitor structure according to claim 1 wherein said cathode material comprises carbon on titanium carbide.

9. A capacitor structure according to claim 1 wherein said cathode material comprises carbon and silver vanadium oxide on titanium carbide.

10. A capacitor structure according to claim 1 wherein said cathode material comprises carbon and crystalline manganese dioxide on titanium carbide.

11. A capacitor structure according to claim 1 wherein said cathode material comprises platinum on titanium.

12. A capacitor structure according to claim 1 wherein said cathode material comprises ruthenium on titanium.

13. A capacitor structure according to claim 1 wherein said cathode material comprises silver vanadium oxide on titanium.

14. A capacitor structure according to claim 1 wherein said cathode material comprises barium titanate on titanium.

15. A capacitor structure according to claim 1 wherein said cathode material comprises carbon and crystalline ruthenium oxide on titanium carbide.

16. A capacitor structure according to claim 1 wherein said cathode material comprises carbon and crystalline iridium oxide on titanium carbide.

17. A capacitor structure according to claim 1 wherein said capacitor structure includes a feedthrough in said encasement through which electrical coupling may be made between said anode and an external terminal.

18. A capacitor structure according to claim 17 wherein said feedthrough is made of a polymeric material.

19. A capacitor structure according to claim 18 wherein said feedthrough forms a hermetic seal with said encasement.

20. A capacitor structure according to claim 17 further comprising:
   an anode lead coupled to said anode; and
   a terminal lead extending through said feedthrough.

21. A capacitor structure according to claim 20 further comprising a conductive sleeve for receiving said anode lead at a first end thereof and said terminal lead at a second end thereof.

22. A capacitor structure according to claim 21 wherein said anode lead and said terminal lead are electrically coupled to said sleeve by welding.

23. A capacitor structure according to claim 21 wherein said anode lead and said terminal lead are electrically coupled to said sleeve by crimping.

24. A capacitor structure according to claim 21 wherein said sleeve includes an aperture therein intermediate said first end and said second end.

25. A capacitor structure according to claim 20 further comprising a weld block for coupling said anode lead to said terminal lead.

26. A capacitor structure according to claim 20 further comprising a first weld block coupled to said feedthrough.

27. A capacitor structure according to claim 26 further comprising a second weld block coupled to said anode.

28. A capacitor structure according to claim 27 further comprising an electrical coupling between said first and second weld blocks.

29. A capacitor structure according to claim 17 further comprising a conductive sleeve for electrically coupling said anode through said feedthrough.

30. A capacitor structure according to claim 29 wherein said conductive sleeve is imbedded in said anode.

31. A capacitor structure according to claim 29 wherein said conductive sleeve is attached to said feedthrough.

32. A capacitor structure for use in an implantable medical device, said capacitor comprising:
- a shallow drawn case having a first major side and a peripheral wall extending therefrom, said first major side having a first interior surface and said wall having a peripheral interior surface;
- a lid sealing coupled to said case along adjacent edges of said lid and said wall, said lid and said case forming an encasement of said capacitor structure, said lid comprising a second interior surface;
- a cathode material disposed proximate said first and second interior surfaces;
- an anode positioned intermediate the cathode material and having peripheral portion positioned proximate said adjacent edges;
- a protective layer on said peripheral portion to protect said anode when said lid is sealing coupled to said case;
- a first insulative separator between said anode and said capacitive material;
- an electrolyte within said encasement and in contact with said cathode material and said anode; and
- a feedthrough in said encasement through which electrical coupling may be made between said anode and an external terminal.

33. A capacitor structure according to claim 32 wherein said protective layer comprises a metalized ring.

34. A capacitor structure according to claim 32 wherein said metalized ring comprises a polymer spacer having a metalized surface.

35. A capacitor structure according to claim 32 wherein said protective layer comprises a metallized tape.

36. A capacitor structure according to claim 32 further comprising a second insulative separator positioned between said cathode material and said first and second interior surfaces.

37. A capacitor structure according to claim 36 wherein said cathode material is electrically coupled to said encasement, said encasement forming a cathode terminal.

* * * * *